(12) United States Patent
Zhou et al.

(10) Patent No.: US 8,389,782 B2
(45) Date of Patent: Mar. 5, 2013

(54) BIOFUEL PRODUCTION THROUGH CATALYTIC DEOXYGENATION

(75) Inventors: Zhen Zhou, Emeryville, CA (US); Lin Li, Albany, CA (US); Shabbir Husain, San Pablo, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 79 days.

(21) Appl. No.: 12/873,113

(22) Filed: Aug. 31, 2010

(65) Prior Publication Data

US 2012/0047795 A1  Mar. 1, 2012

(51) Int. Cl.
*C07C 1/207* (2006.01)

(52) U.S. Cl. .......... 585/240; 585/14; 585/242; 585/640; 585/733; 44/385; 44/386

(58) Field of Classification Search ............ 585/14, 585/240, 242, 638, 639, 640, 646, 733; 554/174; 502/220, 307; 208/247, 295, 296, 299; 44/386, 44/385
See application file for complete search history.

(56) References Cited

U.S. PATENT DOCUMENTS

| | | | |
|---|---|---|---|
| 4,102,938 A * | 7/1978 | Rao ................ | 585/640 |
| 4,300,009 A * | 11/1981 | Haag et al. ........... | 585/408 |
| 4,394,297 A | 7/1983 | Kolts | |
| 4,515,667 A | 5/1985 | Bartoszek-Loza | |
| 4,693,991 A | 9/1987 | Bjornson et al. | |
| 5,164,073 A | 11/1992 | Lam | |
| 5,164,497 A | 11/1992 | King et al. | |
| 5,242,881 A | 9/1993 | Tang et al. | |
| 5,371,055 A | 12/1994 | Cormier et al. | |
| 5,801,115 A | 9/1998 | Albers et al. | |
| 5,910,242 A | 6/1999 | Halbert et al. | |
| 6,338,794 B1 | 1/2002 | Khare | |
| 7,563,915 B2 * | 7/2009 | Matson et al. ............ | 554/167 |
| 2004/0026299 A1 | 2/2004 | Chamberlain Pravia et al. | |
| 2004/0087809 A1 * | 5/2004 | Nakayama et al. .......... | 554/174 |
| 2004/0149628 A1 | 8/2004 | Ou et al. | |
| 2005/0098478 A1 | 5/2005 | Gupta et al. | |
| 2007/0010682 A1 * | 1/2007 | Myllyoja et al. ............ | 554/174 |
| 2007/0282119 A1 | 12/2007 | Matson et al. | |
| 2008/0071125 A1 | 3/2008 | Li | |
| 2009/0000185 A1 | 1/2009 | Aulich et al. | |
| 2009/0151234 A1 * | 6/2009 | Portilho et al. ............. | 44/308 |
| 2009/0305872 A1 | 12/2009 | Stamires et al. | |
| 2011/0237854 A1 * | 9/2011 | Heil et al. .................... | 585/639 |
| 2012/0035403 A1 * | 2/2012 | Flytzani-Stephanopoulos et al. ... | 585/240 |
| 2012/0157728 A1 * | 6/2012 | Vermeiren et al. ........... | 585/240 |

FOREIGN PATENT DOCUMENTS

| | | |
|---|---|---|
| GB | 485123 | 5/1938 |
| WO | 2008/058664 | 5/2008 |

OTHER PUBLICATIONS

Lima, et al., "Diesel-Like Fuel Obtained by Pyrolysis of Vegetable Oils" in J. Anal. Appl. Pyrolysis, 71 (2004) 987-996.*
Lestari, S. et al., Catalytic Deoxygenation of Stearic Acid in a Continuous Reactor over a Mesoporous Carbon-Supported Pd Catalyst. Energy & Fuels 2009, 23, 3842-3845.
Maki-Arvela, P., Catalytic Deoxygenation of Fatty Acids and Their Derivatives. Energy & Fuels 2007, 21, 30-41.
Juliana Pereira Silva, et al., Characterization of commercial ceramic adsorbents and its application on naphthenic acids removal of petroleum distillates, Mat. Res. vol. 10 No. 2 Apr./Jun. 2007.
Aihua Zhang, et al., Improved Processes to Remove Naphthenic Acids, Annual Technical Progress Report, From Oct. 2002-Sep. 2003, California Institute of Technology.

* cited by examiner

*Primary Examiner* — In Suk Bullock
*Assistant Examiner* — Bradley Etherton

(57) ABSTRACT

A process useful for treating biologically derived oils in the production of biofuels is described. A biologically derived oil feed is deoxygenated by contacting the feed with a metal titanate catalyst comprising a metal titanate having an $MTiO_3$ perovskite structure wherein M is a metal having a valence of 2+. The process does not require the addition of hydrogen.

23 Claims, 3 Drawing Sheets

BIOFUEL PRODUCTION THROUGH CATALYTIC DEOXYGENATION

FIELD

The disclosure relates to a process for removing oxygen from a biologically derived oil in which the oil is contacted with a catalyst, resulting in a hydrocarbon products suitable for use as transportation fuel.

BACKGROUND

Biodiesel from biologically derived oils and fats have been attracting increased attention due to its potential of providing a significant portion of transportation fuels. Biologically derived oils and fats are complex mixtures of triglycerides and free fatty acids. Transesterification, i.e. reacting triglycerides with methanol to produce fatty acid methyl-ester (FAME), is used to make biodiesel from biologically derived oils and fats. See, for example, Huber et al., "Synthesis of Transportation Fuels from Biomass: Chemistry, Catalysts, and Engineering," Chem. Rev., vol. 106, pp. 4044-4098, 2006; and Antolin et al., "Optimisation of Biodiesel Production by Sunflower Oil Transesterification," Bioresource Technology, vol. 83 (2002), pp. 111-114. FAMEs generally have a high cetane number and are considered to burn cleanly, but they still contain problematic levels of oxygen. A major drawback of this type of biodiesel is that it generally has poor oxidative and thermal stability.

In order to improve the energy density and stability of this type of biodiesel, oxygen must be at least partially removed. Hydrotreating is one route to remove oxygen from triglycerides, but it has the disadvantage that it consumes large amounts of hydrogen since during hydrotreating, oxygen is reacted with hydrogen and removed through the formation of water. The heat release from hydrotreating reactions is also a significant challenge for reactor design. Decarboxylation is another route to remove oxygen from biofuels. Although the hydrocarbons produced through decarboxylation may contain less carbon than its fatty acid or ester counterpart and those from the hydrotreating route, decarboxylation does not consume hydrogen. Generally speaking, consuming the carbon contained in a biologically derived feedstock to remove oxygen is less costly than consuming hydrogen which must be produced through expensive processes.

There have been reports in the literature of biofuel production through decarboxylation and decarbonylation of biologically derived oils using supported noble metal catalysts at relatively high temperatures, e.g., for example, greater than 350° C. For example, platinum (Pt) supported on carbon had been found to be an effective catalyst. However, carbon monoxide (CO) produced from the reaction can poison the Pt catalyst. Hence, high hydrogen partial pressure is needed to keep the catalyst surface clean and reduce catalyst deactivation.

It would be desirable to have a more economical process for producing transportation fuels from biologically derived oils while avoiding the aforementioned difficulties.

SUMMARY

One embodiment is directed to a process for removing oxygen from a biologically derived oil feed comprising fatty acids and/or fatty acid esters, by contacting the feed with a catalyst comprising a metal titanate having an $MTiO_3$ structure wherein M is a metal having a valence of 2+ in the absence of added hydrogen gas, resulting in a hydrocarbon product having a final oxygen content less than the initial oxygen content.

DEFINITIONS

Figure 1:
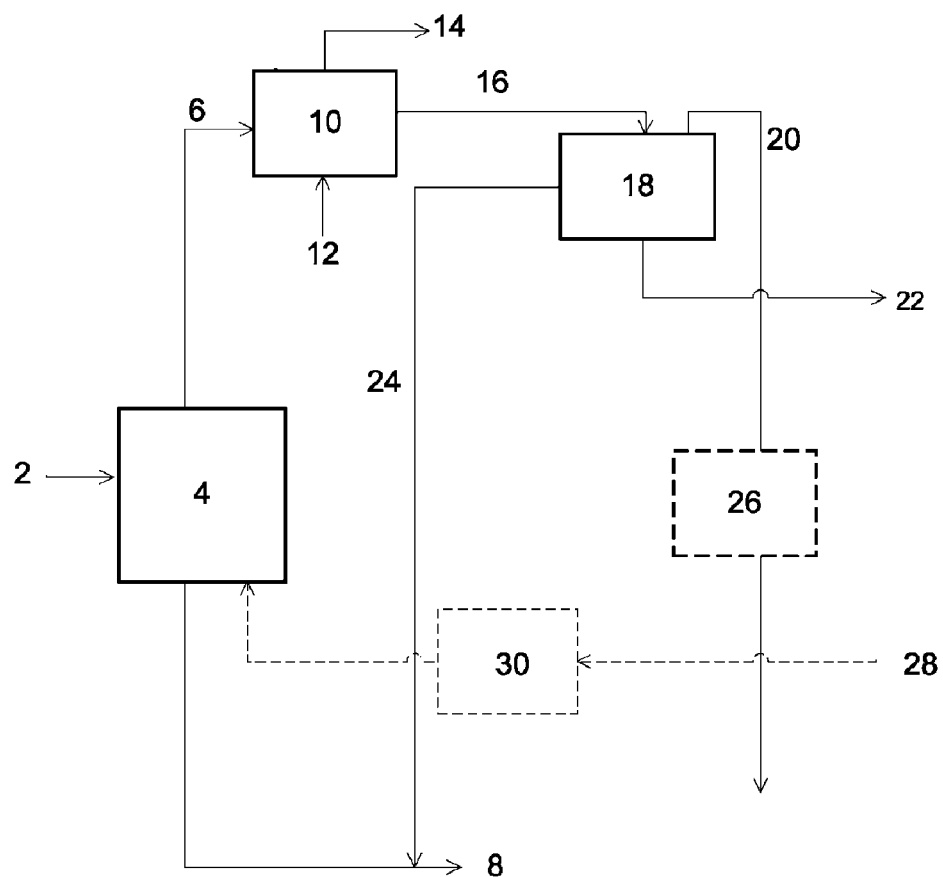
FIG. 1 is a block flow diagram illustrating a process scheme in which a feed is fed to a fixed bed reactor containing a bed of catalyst comprising a metal titanate having a $MTiO_3$ structure.

The following terms will be used throughout the specification and will have the following meanings unless otherwise indicated.

The prefix "bio," as used herein, refers to an association with a renewable resource of biological origin, such resources generally being exclusive of fossil fuels.

A "biologically-derived oil," as defined herein, refers to any triglyceride-containing oil that is at least partially derived from a biological source such as, but not limited to, crops, vegetables, microalgae, and the like. Such oils may further comprise free fatty acids. Plant and animal oils and fats typically contain 0-30 wt % free fatty acids, which are formed during hydrolysis (e.g. enzymatic hydrolysis) of triglycerides. The amount of free fatty acids present in vegetable oils is typically 1-5 wt % and in animal fat, 10-25 wt %. The biological source is henceforth referred to as "biomass." For more on the advantages of using microalgae as a source of triglycerides, see R. Baum, "Microalgae are Possible Source of Biodiesel Fuel," Chem. & Eng. News, vol. 72(14) (1994), pp. 28-29.

"Triglyceride," as defined herein, refers to class of molecules having the following general formula:

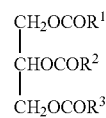

$$CH_2OCOR^1$$
$$CHOCOR^2$$
$$CH_2OCOR^3$$

where $R^1$, $R^2$, and $R^3$ are molecular chains comprising carbon and hydrogen, and can be the same or different, and wherein one or more of the branches defined by $R^1$, $R^2$, and $R^3$ can have unsaturated regions. "Triglyceride-based," as defined herein, is used to describe biofuel precursor material comprising triglyceride species in the majority (by weight), but possibly also comprising other oxygenate species such as free fatty acids.

A "carboxylic acid" or "fatty acid," as defined herein, is a class of organic acids having the general formula:

R—COOH where R is generally a saturated (alkyl)hydrocarbon chain or a mono- or polyunsaturated (alkenyl)hydrocarbon chain.

"Transesterification," or simply "esterification," refers to the reaction between a fatty acid or ester (e.g., a triglyceride) and an alcohol to yield an ester species.

"Transportation fuels," as defined herein, refer to hydrocarbon-based fuels suitable for consumption by vehicles. Such fuels include, but are not limited to, diesel, gasoline, jet fuel and the like.

"Diesel fuel," as defined herein, is a material suitable for use in diesel engines and conforming to the current version at least one of the following specifications: ASTM D 975-"Standard Specification for Diesel Fuel Oils"; European Grade CEN 90; Japanese Fuel Standards JIS K 2204; The United States National Conference on Weights and Measures (NCWM) 1997 guidelines for premium diesel fuel; and The United States Engine Manufacturers Association recommended guideline for premium diesel fuel (FQP-1A).

"Biodiesel," as used herein, refers to diesel fuel that is at least significantly derived from a biological source, and which is generally consistent with ASTM International Standard Test Method D-6751. Often, biodiesel is blended with conventional petroleum diesel. B20 is a blend of 20 percent biodiesel with 80 percent conventional diesel. B100 denotes pure biodiesel.

"Carbon number" or "$C_n$," where "n" is an integer, describes a hydrocarbon or hydrocarbon-containing molecule or fragment (e.g., an alkyl or alkenyl group) wherein "n" denotes the number of carbon atoms in the fragment or molecule.

While "hydrocarbons" are substantially comprised of carbon and hydrogen, hydrocarbon-based materials can include molecules with heteroatoms, e.g., alcohols, carboxylic acids, and the like; the heteroatoms generally being atoms other than C or H, and typically atoms selected from the group consisting of O, N, S, P, and combinations thereof.

"Transportation fuels," as defined herein, refers to hydrocarbon-based fuels suitable for consumption by vehicles. Such fuels include, but are not limited to, diesel, gasoline, jet fuel and the like.

"Deoxygenation" refers to the removal of oxygen from organic molecules, such as fatty acid derivatives, alcohols, ketones, aldehydes or ethers.

"Decarboxylation" refers to the removal of carboxyloxygen from acid molecules.

"Decarbonylation" refers to the removal of carbonyl oxygen from organic molecules with carbonyl functional groups other than acids.

DETAILED DESCRIPTION

The present disclosure provides embodiments for deoxygenating a biologically derived oil feed by contacting the oils with a metal titanate catalyst in the absence of added hydrogen gas. The feed is contacted with a metal titanate catalyst in a suitable reactor. A single catalyst bed or multiple catalyst beds may be used. In one embodiment, the feed is passed over the catalyst in a fixed bed reactor operating in continuous mode. In another embodiment, the feed is passed over a monolithic catalyst in a reactor operating in continuous mode. In another embodiment, the feed contacts the catalyst in a slurry bed reactor in continuous mode. Either an upflow or downflow type reactor can be used. Multiple reactors may be used in parallel. The feed can also be contacted with the catalyst in a batch reactor.

The bio oil and/or fat used as the feed in the embodiments described herein originates from renewable sources, such as fats and oils from plants and/or animals and/or fish and compounds derived from them. The basic structural unit of a typical plant or vegetable or animal oil/fat useful as the feedstock is a triglyceride, which is a triester of glycerol with three fatty acid molecules, having the structure presented in the following formula I:

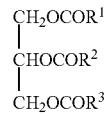

In formula I, $R^1$, $R^2$, and $R^3$ can be alkyl chains. Fatty acids found in natural triglycerides are almost solely fatty acids of even carbon number. Therefore $R^1$, $R^2$, and $R^3$ generally are $C_5$-$C_{23}$ alkyl groups, typically $C_{11}$-$C_{19}$ alkyl groups and often $C_{15}$ or $C_{17}$ alkyl groups. $R^1$, $R^2$, and $R^3$ may contain carbon-carbon double bonds. These alkyl chains can be saturated, unsaturated or polyunsaturated.

Suitable bio oils are plant and vegetable oils and fats, animal fats, fish oils, and mixtures thereof containing fatty acids and/or fatty acid esters. Nonlimiting examples of suitable materials are wood-based and other plant-based and vegetable-based fats and oils such as rapeseed oil, colza oil, canola oil, tall oil, sunflower oil, soybean oil, hempseed oil, olive oil, linseed oil, mustard oil, palm oil, peanut oil, castor oil, coconut oil, algae oil, as well as fats contained in plants bred by means of gene manipulation, animal-based fats such as lard, bacon fat, tallow, train oil, and fats contained in milk, as well as recycled fats of the food industry and mixtures of the above.

Bio oils and fats suitable as feed may comprise $C_{12}$-$C_{24}$ fatty acids, derivatives thereof such as anhydrides or esters of fatty acids as well as triglycerides of fatty acids or combinations thereof. Fatty acids or fatty acid derivatives, such as esters may be produced via hydrolysis of bio oils or by their fractionalization or transesterification reactions of triglycerides.

Catalysts suitable for use in the embodiments described herein include metal titanates, also referred to herein interchangeably as titanates, which can be expressed as $MTiO_3$ wherein M is a metal having a valence of 2+. The metal M may also be capable of multiple valences. In one embodiment, the catalyst consists essentially of at least a metal titanate of the formula $MTiO_3$. Pure metal titanates have a perovskite crystalline structure. The catalyst can contain at least 80% by weight titanate. In another embodiment, the catalyst contains at least 1% by weight titanate; in another embodiment at least 5% by weight titanate; in another embodiment at least 10% by weight titanate based on the total weight of the catalyst, including any other desirable active components as well as optional support material. The actual amount of titanate needed will vary depending on whether or not a support is used, and how the catalyst is dispersed on the support. Examples of suitable metal titanates for use in the catalyst include, but are not limited to, magnesium titanate, copper titanate, nickel titanate, iron(II) titanium oxide, cobalt titanium oxide, manganese(II) titanium oxide, lead(II) titanate, calcium titanate, barium titanate, zinc titanate, and mixtures thereof. In one embodiment, the catalyst has a BET surface area greater than 20 m²/g; in another embodiment the BET surface area is greater than 200 m²/g; in yet another embodiment the BET surface area is greater than 400 m²/g.

In one embodiment, the catalyst is a supported catalyst. Suitable support materials include silica, alumina, silica-alumina, carbon, molecular sieves and mixtures thereof. In one embodiment, the catalyst is deposited on a carbon support having a BET surface area of between 500 m²/g and 1500 m²/g. In another embodiment, the catalyst is deposited on a support selected from silica, alumina, silica-alumina and mixtures thereof, and the support has a BET surface area of between 150 m²/g and 600 m²/g. In one embodiment, the support can be a monolithic support. Alternatively, the catalyst can be unsupported.

The feed is contacted with the catalyst at a temperature of less than 500° C., in one embodiment from 200° C. to 500° C., and in one embodiment from 200° C. to 400° C. In one embodiment, the pressure within the reactor is between 100 kPa and 1000 kPa (all pressures indicated herein are absolute). The pressure can be below 100 kPa, although depending on the pressure in the surrounding equipment, it may be necessary to pump the stream exiting the reactor to a higher pressure. In one embodiment, the LHSV is between 0.1 and 10 in another embodiment, the LHSV is between 0.2 and 5.0 $h^{-1}$; in another embodiment, between 0.4 and 2.0 $h^{-1}$. LHSV refers to the volumetric liquid feed rate per total volume of catalyst and is expressed in the inverse of hours ($h^{-1}$).

In one embodiment, the reaction is conducted in the absence of added hydrogen.

In one embodiment illustrated in FIG. 1, a feed 2 is fed to a fixed bed reactor 4 containing a bed of catalyst comprising a metal titanate having a $MTiO_3$ structure. The process can alternatively be conducted in a slurry bed reactor (not shown). Treated product stream 8 is removed from the bottom of the reactor for further processing as desired. Gas stream 6 containing various components including, but not limited to, carbon dioxide, and water vapor is removed from the top of the reactor and passes through condenser 10 utilizing cooling water 12. Effluent cooling water 14 exits from the condenser. Condensed and mixed stream 16 is sent to three-phase separator 18. Gas stream 20 is removed from the separator and processed. Water 22 is removed from the separator. Product stream 24 is removed from the separator and combined with product stream 8.

In one embodiment, the metal titanate catalyst bed can optionally be subjected to the flow of an inert stripping gas stream 28, which can be, for example, nitrogen. A blower or compressor 30 can be used to feed low pressure stripping gas stream 28 to the reactor. This gas stream can serve to strip carbon dioxide and water vapor from the reactor 4. In one embodiment, the flow of gas is countercurrent to the flow of the hydrocarbon feed. In one embodiment, the flow of gas is between 50 and 200 scf/bbl (standard cubic feet of gas per barrel of feed).

The embodiments disclosed herein result in a product having a lower oxygen content than that of the feed. In some embodiments, the final oxygen content of the product is at least 20% less than the initial oxygen content of the feed. In some embodiments, the final oxygen content is at least 50% less than the initial oxygen content of the feed.

TEST METHODS

Catalyst surface area was determined by $N_2$ adsorption at its boiling temperature. BET surface area was calculated by the 5-point method at $P/P_0$=0.050, 0.088, 0.125, 0.163, and 0.200. Catalyst samples were first pre-treated at 400° C. for 6 hours in the presence of flowing, dry $N_2$ so as to eliminate any adsorbed volatiles like water or organics.

$CO_2$ concentration was measured using an inline infrared $CO_2$ analyzer available from Qubit Systems, Inc., Kingston, Ontario.

EXAMPLES

Example 1

Figure 2:
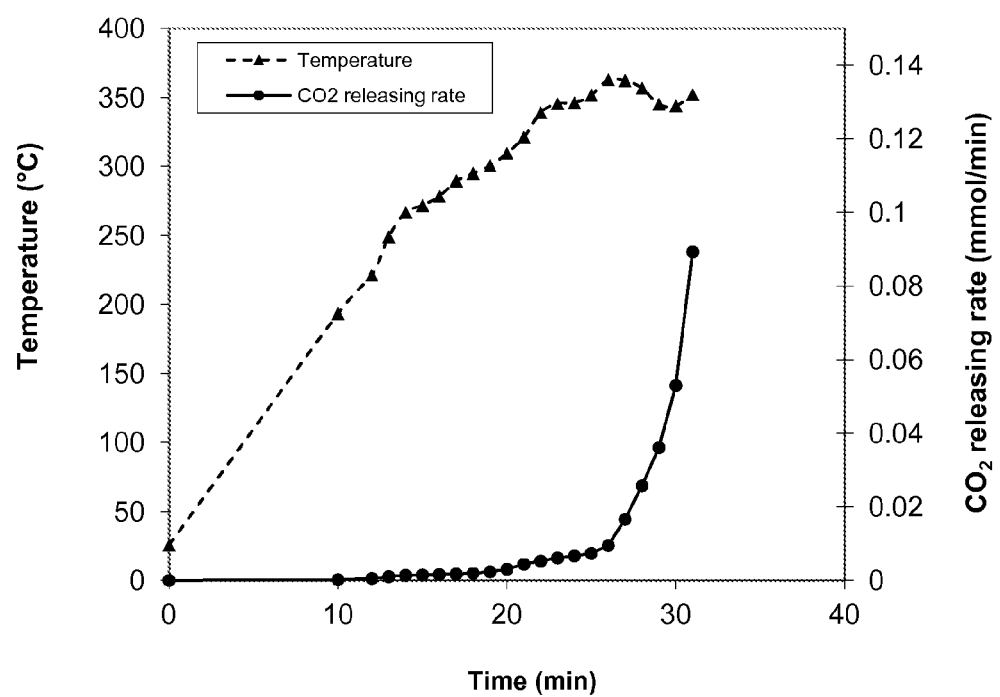
FIG. 2 is a graph of the experimental results of Example 1.

A batch reactor was loaded with 16 g stearic acid having 3.55 mmol $O_2$/g (obtained from P&G Chemicals, Cincinnati, Ohio) and 4 g $ZnTiO_3$ (product number 634409, obtained from Sigma-Aldrich Corp., St. Louis, Mo.) catalyst. $N_2$ was used as a purge gas to remove $CO_2$ formed through decarboxylation reactions. $CO_2$ concentration was measured to monitor the progress of the reaction. FIG. 2 shows the results. It can be seen that at 350° C. there was a marked $CO_2$ release. The rate of $CO_2$ release is equivalent to the deoxygenation rate when considered on a molar basis. The highest deoxygenation rate was 0.089 mmol $O_2$/min, indicating accelerated decarboxylation reaction.

Example 2

Figure 3:
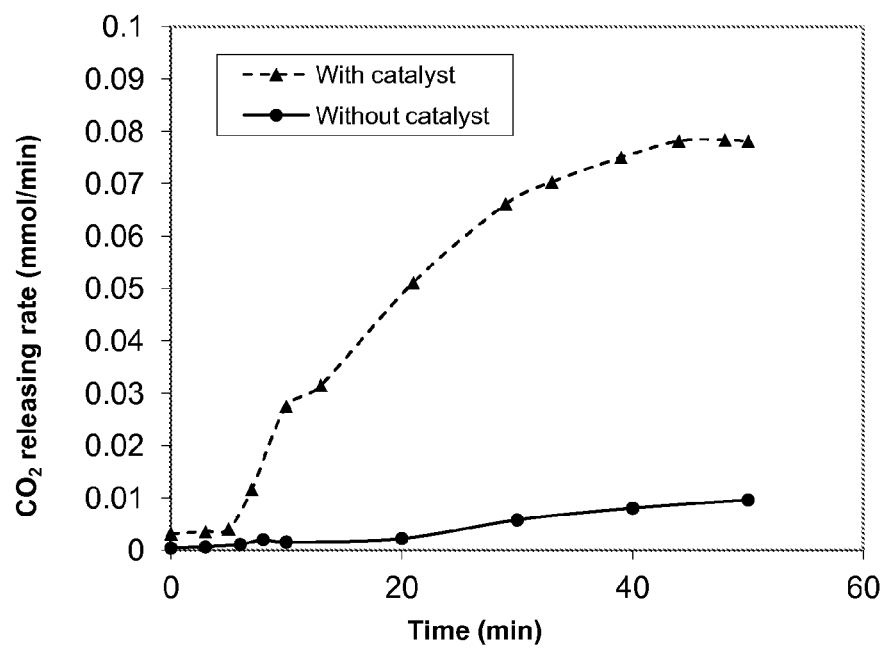
FIG. 3 is a graph of the experimental results of Example 2.

To examine catalyst activity for deoxygenation of triglycerides, 10 g canola salad oil having 3.39 mmol $O_2$/g (sold under the name "Superb" and obtained from Costco Wholesale Corporation, Richmond, Calif.) and 2.5 g $ZnTiO_3$ (product number 634409, obtained from Sigma-Aldrich Corp., St. Louis, Mo.) catalyst were mixed and heated from room temperature to 350° C. in a batch reactor, with $N_2$ as a purge gas to remove $CO_2$ formed during the reaction. The results are shown in FIG. 3. The highest deoxygenation rate was 0.078 mmol $O_2$/min. FIG. 3 also presents blank test results (without the catalyst). These results clearly indicate that $ZnTiO_3$ can catalyze canola oil deoxygenation reactions.

The testing results shown above indicate that ZnTiO3 has considerable catalytic activity for deoxygenation reactions of both fatty acid (stearic acid) and triglycerides (canola oil), as demonstrated by the rate of $CO_2$ release.

The process embodiments described herein can be used to produce a biofuel. Alternatively, the process embodiments described herein can be used to pretreat a feed stream for further processing in known operations, such as, for example, conventional refining.

The particular embodiments disclosed above are illustrative only, and may be modified and practiced in different but equivalent manners apparent to those skilled in the art having the benefit of the teachings herein. Furthermore, no limitations are intended to the details of construction or design herein shown, other than as described in the claims below.

What is claimed is:

1. A process for removing oxygen from a biologically derived oil, consisting of:
   contacting a feed comprising a biologically derived oil containing 0-30 wt. % fatty acids having an initial oxygen content with a catalyst consisting essentially of a metal titanate having an $MTiO_3$ wherein M is a metal having a valence of 2+,
   thereby resulting in a product having a final oxygen content less than the initial oxygen content of the feed;
   wherein the feed is contacted with the catalyst without the addition of hydrogen gas for the removal of oxygen.

2. The process of claim 1, wherein the product has a final oxygen content at least 20% less than the initial oxygen content of the feed.

3. The process of claim 1, wherein the product has a final oxygen content at least 50% less than the initial oxygen content of the feed.

4. The process of claim 1, wherein the biologically derived oil is derived from a plant source, an animal source, or mixtures thereof.

5. The process of claim 1, wherein the biologically derived oil comprises FAME.

6. The process of claim 1, wherein the biologically derived oil comprises pyrolysis oil.

7. The process of claim 1, wherein the catalyst comprises at least 1% by weight metal titanate.

8. The process of claim 1, wherein the catalyst comprises at least 5% by weight metal titanate.

9. The process of claim 1, wherein the catalyst comprises at least 10% by weight metal titanate.

10. The process of claim 1, wherein the catalyst comprises at least 80% by weight metal titanate.

11. The process of claim 1, wherein the catalyst further comprises a support selected from the group consisting of silica, alumina, silica-alumina, carbon, molecular sieves and mixtures thereof.

12. The process of claim 1, wherein the feed is contacted with the catalyst at a temperature of less than 500° C.

13. The process of claim 1, wherein the feed is contacted with the catalyst at a temperature of less than 400° C.

14. The process of claim 1, wherein the feed is contacted with the catalyst at a temperature of between 250° C. and 350° C.

15. The process of claim 1, wherein the feed is contacted with the catalyst at a pressure of between 100 kPa and 1000 kPa absolute.

16. The process of claim 1, wherein the catalyst comprises a metal titanate selected from the group consisting of magnesium titanate, copper titanate, nickel titanate, iron(II) titanium oxide, cobalt titanium oxide, manganese(II) titanium oxide, lead(II) titanate, calcium titanate, barium titanate and zinc titanate.

17. The process of claim 1, wherein the catalyst comprises a metal titanate selected from the group consisting of calcium titanate, barium titanate and zinc titanate.

18. The process of claim 1, wherein the feed is contacted with the catalyst at a LHSV of between 0.2 and 5 $h^{-1}$.

19. The process of claim 1, wherein the feed is contacted with the catalyst in a fixed bed reactor.

20. The process of claim 1, wherein the feed is contacted with the catalyst in a slurry bed reactor.

21. The process of claim 1, wherein the metal titanate has a perovskite structure.

22. The process of claim 1, wherein the product having a final oxygen content less than the initial oxygen content of the feed is a transportation fuel.

23. The process of claim 1, wherein the product having a final oxygen content less than the initial oxygen content of the feed is a biodiesel.

* * * * *